United States Patent [19]

Luyckx

[11] Patent Number: 5,344,370
[45] Date of Patent: Sep. 6, 1994

[54] TRANSMISSION FOR MOTOR VEHICLES

[75] Inventor: Johan Luyckx, Lennik, Belgium

[73] Assignee: Volvo Car Sint-Truiden, Naamloze vennootschap, Sint-Truiden, Belgium

[21] Appl. No.: 19,280

[22] Filed: Feb. 18, 1993

[30] Foreign Application Priority Data

Feb. 18, 1992 [BE] Belgium .............................. 09200168

[51] Int. Cl.$^5$ .............................................. F16H 3/44
[52] U.S. Cl. ...................................... 475/319; 475/346
[58] Field of Search .................................. 475/319, 346

[56] References Cited

U.S. PATENT DOCUMENTS

| 740,128 | 9/1903 | Harvey | 475/319 |
|---|---|---|---|
| 1,803,045 | 4/1931 | Valentine et al. | 475/319 |
| 4,502,353 | 3/1985 | Beaudoin | 475/298 |
| 5,240,462 | 8/1993 | Mochiznki et al. | 475/342 |

FOREIGN PATENT DOCUMENTS

| 0264970 | 4/1988 | European Pat. Off. | |
| 0095341 | 12/1923 | Norway | 475/319 |
| 599508 | 3/1948 | United Kingdom . | |
| 2102515 | 2/1983 | United Kingdom . | |
| 2148421 | 5/1985 | United Kingdom . | |

*Primary Examiner*—Dirk Wright

[57] ABSTRACT

Transmission for motor vehicles, more particularly a transmission which is provided with a reversing unit making use of a planetary coupling (1), whereby said planetary coupling (1) consists of a first shaft (2), a planetary support (3) mounted on this first shaft (2), planet wheels (4,5) mounted on this planetary support (3), a sun wheel (6) co-operating with the planet wheels (4,5), a second shaft (7) coupled to the sun wheel (6) and a ring wheel (8) co-operating with the planet wheels (4,5), and wherein the planetary support (3) and the ring wheel (8) of the planetary transmission (1) are provide of means which allow that, upon choice, either the ring wheel (8) can be locked against rotation or the planetary support (3) can be coupled to the sun wheel (6), characterized in that at least one bearing (9) is provided between the ring wheel (8) and the planetary support (3) which provides in a radial bearing between the ring wheel (8) and the planetary support (3), and in that said bearing (9) and the planet wheels (4,5) are mutually arranged in such a way that they coincide with at least one mutual radial plane, in other words a plane transverse through the axis of rotation of the said first shaft (2) and second shaft (7).

10 Claims, 2 Drawing Sheets

TRANSMISSION FOR MOTOR VEHICLES

This invention relates to a transmission for motor vehicles, for the transmission of the rotary movement of the shaft of the motor of the vehicle to the driven wheel shafts, and more particularly a transmission of the type that is provided with a reversing unit making use of a planetary coupling, in which said planetary coupling consists of a first shaft, a planetary support mounted on this first shaft, planet wheels mounted on this planetary support, a sun wheel co-operating with the planet wheels, a second shaft coupled to the sun wheel and the ring wheel co-operating with the planet wheels, and wherein the planetary support and the ring wheel of the planetary coupling are provided of means which allow that, upon choice, either the ring wheel can be locked against rotation or the planetary support can be coupled to the sun wheel.

The known transmissions of the above said type show the disadvantage that at high speeds the sound levels may become unacceptable as a result of plays between the ring wheel and the planet wheels of the planetary coupling. This phenomenon occurs in particular in embodiments in which the ring wheel is suspended freely around the planet wheels.

From the documents GB-A-599.508 and GB-A-2.148.421 planetary couplings are known, which provide in a bearing between the planetary support and the ring wheel. The embodiments known from these documents, however, do not offer a solution to the aforesaid disadvantage, and moreover are not suitable to be used as a coupling between the motor of the motor vehicle and the driven shaft.

Consequently the invention relates to a transmission for motorvehicles in which said disadvantage is excluded.

More particularly, the invention envisages a transmission having a planetary coupling acting as a reversing unit, in which the inclination and the radial displacement of the ring wheel of the planetary coupling is prevented in an optimal manner.

The invention also envisages a transmission which is very compact and which allows that the axial length of it can be reduced to a strict minimum.

To this end the invention relates to a transmission for motor vehicles, more particularly a transmission wich is provided with a reversing unit making use of a planetary coupling, whereby said planetary coupling consists of a first shaft, a planetary support mounted on this first shaft, planet wheels mounted on this planetary support, a sun wheel co-operating with the planet wheels, a second shaft coupled to the sun wheel and a ring wheel co-operating with the planet wheels, and wherein the planetary support and the ring wheel of the planetary transmission are provided of means which allow that, upon choice, either the ring wheel can be locked against rotation or the planetary support can be coupled to the sun wheel, characterized in that at least one bearing is provided between the ring wheel and the planetary support which provides in a radial bearing between the ring wheel and the planetary support, and in that said bearing and the planet wheels are mutually arranged in such a way that they coincide with at least one mutual radial plane, in other words a plane transverse through the axis of rotation of the said first and second shafts.

As the said bearing and the planet wheels have one mutually radial plane, or expressed in other words, are overlapping each other at least partially in axial direction, the inclination at the location of the planet wheels is limited optimally, and furthermore it is made possible to minimize the axial length of the transmission.

Preferably a bearing is provided which extends axially, wherein the bearing and the planet wheels are overlapping each other in axial direction for at least 50% of the axial length of the bearing. Even more preferable, said value will be 100%.

The invention is particularly useful in transmissions which are provided of a non-stepwise controlled or continuously variable transmission.

In order to better explain the characteristics according to the invention, by way of example only and without being limitative in any way, hereafter a preferred embodiment is described with reference to the accompanying drawings, in which.

Figure 1:
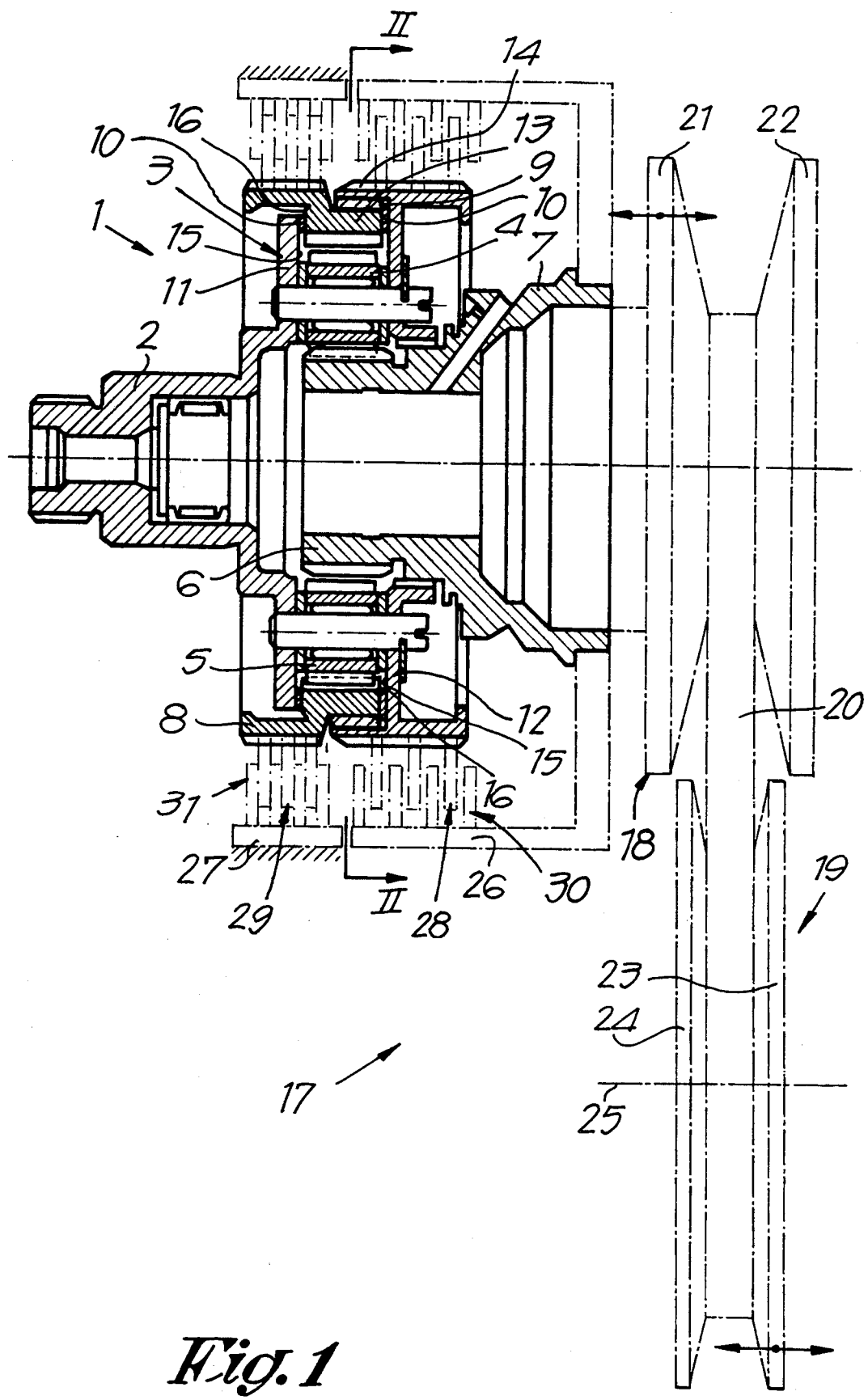
FIG. 1 shows a transmission according to the invention.

As shown in FIG. 1, the invention relates to a transmission for motor vehicles, more particularly a transmission that is provided with a reversing unit making use of a planetary coupling 1.

Figure 2:
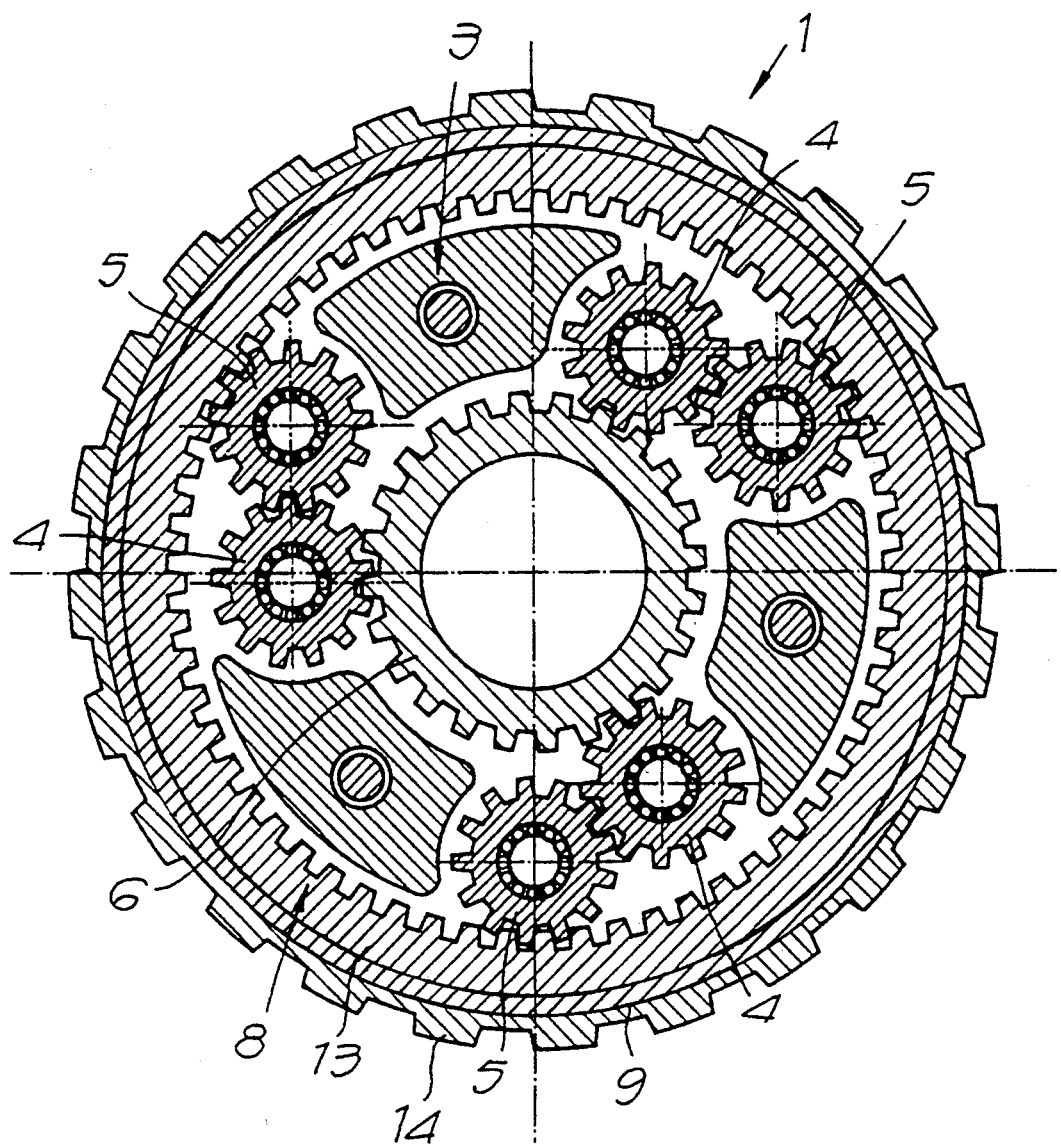
FIG. 2 shows a cross section according to line II—II in FIG. 1.

Hereby, the planetary transmission 1 mainly consists of a first shaft 2, a planetary support 3 mounted on the first shaft 2, planet wheels 4 and 5 mounted on the planetary support 3, a sun wheel 6 co-operating with the planet wheels 4, a second shaft 7 coupled to the sun wheel 6 and a ring wheel 8 co-operating with the planet wheels 5. As shown in FIG. 2, use is made in this example of three pairs of planet wheels 4 and 5. It is clear, however, that instead of the pairs, use could also be made of respective one single planet wheel, co-operating with both the sun wheel 6 and the ring wheel 8.

In order to obtain that the planetary coupling 1 functions as a reversing unit, in which for example the first shaft 2 forms the input shaft, whilst the second shaft 7 forms the output shaft, suitable means will be provided which allow that, upon choice, either the ring wheel 8 can be locked against rotation, or the planetary support 3 can be coupled to the sun wheel 6, said means being described in detail further on.

The transmission according to the invention is special in that the reversing unit is provided of a planetary coupling 1, the latter being characterized in that at least one bearing 9 is provided between the ring wheel 8 and the planetary support 3 which provides in a radial bearing between the ring wheel 8 and the planetary support 3, and in that said bearing 9 and the planet wheels 4 and 5 are mutually arranged in such a way that they coincide with at least one mutual radial plane, in other words a plane transverse through the axis of rotation of said first shaft 2 and second shaft 7.

Preferably a bearing 9 is provided which extends axially, wherein the bearing 9 and the planet wheels 4 and/or 5 are overlapping each other in axial direction for at least 50% of the axial length of the bearing 9. Even more preferable, said value will be 100%.

Apart of the abovesaid, an axial bearing by means of one or more bearings 10 may be provided.

The planetary support 3, which consists of a base plate 11 and an end plate 12 attached to it in between which the planet wheels 4 and 5 are provided, is, in order to realize the above-mentioned bearings, provided with an end plate 12 which surrounds the ring wheel 8 at least partially, such that between the parts 13 and 14 which fit together, a space is created for the bearing 9. The axially operating bearings 10 are preferably provided between the sides 15 and 16 of the planetary support 3 which are directed towards each other and the ring wheel 8.

It is clear that instead of several bearings 9 and 10, use can also be made of one conical bearing which provides both for the radial and the axial bearing.

The bearings 9 and 10 can be of any type whatsoever, such as for example a sliding bearing, a roller bearing, a needle bearing, a pivot bearing, a combi-bearing, etc. Sliding bearings and needle bearings are preferred, since they require little space.

Thanks to the use of a bearing 9 arranged in the abovesaid manner, occasionally in combination with said bearing 10, it is optimally avoided that the ring wheel 8 and the planetary support 3 start oscillating in relation to one another and the inclination of the ring wheel 8 is avoided.

Apart of the above-mentioned reverse-unit, the transmission comprises a further transmission 17, the transmission ratio of it being adjustable, wherein this transmission 17 preferably consists of a continuous variable transmission.

As shown in FIG. 1, use is made in such a continuously variable transmission 17 of two pulleys 18 and 19, in between which an endless transmission element 20 is provided. The pulleys 18 and 19 consist of conical pulleys halves 21–22 and 23–24 of which one pulley half, 21 and 23 respectively, can be axially moved such that the course radius of the transmission element 20 can be altered, as a result of which the transmission ratio between the shaft 7 and the shaft 25 can be modified.

Since the transmission by means of pulleys 18 and 19 and the belt 20, as opposed to gear transmissions, does not allow to alter the sense of rotation of the shaft 25, a planetary trnamission is provided, which, as mentioned before, is provided with means which allow that, upon choice, either the ring wheel 8 can be locked against rotation or the planetary support 3 can be coupled to the sun wheel 6. These means consist for example of couplings 26 and 27.

As shown in FIG. 1, these couplings 26 and 27 consist of disc couplings with first parts 28 and 29 mounted on the planetary support 3 and the ring wheel 8, and second parts 30 and 31, whereby the second part 30 of coupling 26 is connected to the shaft 7 and the second part 31 of coupling 27 is fixedly mounted.

By exciting the coupling 27, the coupling 26 being non-excited, the ring wheel 8 is kept in place, and consequently the sun wheel 6 and the shaft 7 are turning in the opposite sense as the shaft 2.

By exciting the coupling 26, the coupling 27 being non-excited, the planetary support 3 is coupled to the sun wheel 6 and the shaft 7 is turning in the same sense as the shaft 2.

The present invention is in no way limited to the embodiment described by way of example and shown in the accompanying drawings, on the contrary, such a transmission for motorvehicles can be made in various forms and dimensions while still remaining within the scope of the invention.

I claim:

1. Transmission for motor vehicles, more particularly a transmission which is provided with a reversing unit making use of a planetary coupling (1), whereby said planetary coupling (1) consists of a first shaft (2), a planetary support (3) mounted on this first shaft (2), planet wheels (4,5) mounted on this planetary support (3), a sun wheel (6) co-operating with the planet wheels (4,5), a second shaft (7) coupled to the sun wheel (6) and a ring wheel (8) co-operating with the planet wheels (4,5), and wherein the planetary support (3) and the ring wheel (8) of the planetary transmission (1) are provide of means which allow that, upon choice, either the ring wheel (8) can be locked against rotation or the planetary support (3) can be coupled to the sun wheel (6), characterized in that at least one bearing (9) is provided between the ring wheel (8) and the planetary support (3) which provides in a radial bearing between the ring wheel (8) and the planetary support (3), and in that said bearing (9) and the planet wheels (4,5) are mutually arranged in such a way that they coincide with at least one mutual radial plane, in other words a plane transverse through the axis of rotation of the said first shaft (2) and second shaft (7).

2. Transmission according to claim 1, characterized in that the planetary support (3) at least partly surrounds the ring wheel (8), such that a space is created for the bearing (9) between the parts (13,14) which fit together.

3. Transmission according to claim 1, characterized in that said bearing (9) consists of a bearing extending in axial direction, and in that this bearing (9) and the planet wheels (4,5) overlap each other in axial direction over at least 50% of the axial length of the bearing (9).

4. Transmision according to claim 3, characterized in that the said bearing (9) and the planet wheels (4,5) are overlapping each other in axial direction over 100% of the axial direction of the bearing (9).

5. Transmission according to claim 1, characterized in that said bearing (9) consists of a sliding bearing.

6. Transmission according to claim 1, characterized in that said bearing (9) consists in a needle bearing.

7. Transmission according to claim 1, characterized in that the planetary coupling (1) is also provided with a bearing (10) which provides in an axial bearing between the planetary support (3) and the ring wheel (8).

8. Transmission according to claim 7, characterized in that said bearing (10) which provides in the axial bearing, consists of a sliding bearing.

9. Transmission according to claim 7, characterized in that said bearing (10) which provides in the axial bearing, consists of a needle bearing.

10. Transmission according to claim 1, characterized in that the said means which allow that, upon choice, either the ring wheel (8) can be locked against rotation or the planetary support (3) can be coupled to the sun wheel (6), consist of couplings (26,27) having first parts (28,29) connected to the planetary support (3) and the ring wheel (8) and respective second parts (30,31), one of which being connected to the said second shaft (7) and the other being fixedly mounted.

* * * * *